(12) United States Patent
Watfa

(10) Patent No.: US 12,114,163 B2
(45) Date of Patent: *Oct. 8, 2024

(54) METHOD AND APPARATUS FOR NETWORK SECURITY

(71) Applicant: Samsung Electronics Co., Ltd., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,186

(22) Filed: Apr. 20, 2023

(65) Prior Publication Data

US 2023/0254695 A1     Aug. 10, 2023

Related U.S. Application Data

(63) Continuation of application No. 17/904,007, filed as application No. PCT/KR2021/001682 on Feb. 9, 2021, now Pat. No. 11,678,192.

(30) Foreign Application Priority Data

Feb. 12, 2020   (GB) ..................................... 2001943

(51) Int. Cl.
    *H04W 12/106*     (2021.01)
    *H04W 76/18*      (2018.01)
    *H04W 76/50*      (2018.01)

(52) U.S. Cl.
    CPC ......... *H04W 12/106* (2021.01); *H04W 76/18* (2018.02); *H04W 76/50* (2018.02)

(58) Field of Classification Search
    CPC .... H04W 12/106; H04W 76/18; H04W 76/50
    See application file for complete search history.

(56) References Cited

U.S. PATENT DOCUMENTS 11,678,192 B2 *   6/2023   Watfa ................... H04W 76/50
                                                         455/410
2019/0141515 A1   5/2019   Kim et al.
(Continued)

FOREIGN PATENT DOCUMENTS

EP    3598812 A1      1/2020
WO    2018226072 A2   12/2018

OTHER PUBLICATIONS

International Search Report and Written Opinion of the International Searching Authority dated Apr. 28, 2021, in connection with International Application No. PCT/KR2021/001682, 9 pages.

(Continued)

*Primary Examiner* — Justin Y Lee

(57) ABSTRACT

The present disclosure may be related to a pre-5G or 5G communication system to be provided for supporting higher data rates Beyond 4G communication system such as LTE. A method, for a UE in a network comprising the UE and an AMF entity, is disclosed. The method comprises: transmitting, to the AMF, a control plane service request (CPSR) message comprising data of a first type, receiving, from the AMF, a security mode command message indicating that an integrity check related to the CPSR message has failed, in response to receiving the security mode command message, identifying whether the CPSR message comprises the data of the first type including data of a second type, or the CPSR message comprises the data of the first type excluding the data of the second type, and transmitting the CPSR message excluding the data of the first type except the data of the second type.

20 Claims, 4 Drawing Sheets

(56) References Cited

U.S. PATENT DOCUMENTS

| | | |
|---|---|---|
| 2020/0396788 A1 | 12/2020 | Tiwari et al. |
| 2021/0084528 A1 | 3/2021 | Kim et al. |
| 2021/0410060 A1 | 12/2021 | Ianev et al. |
| 2022/0038897 A1 | 2/2022 | Liu |
| 2022/0046416 A1 | 2/2022 | Suzuki et al. |
| 2022/0053446 A1 | 2/2022 | Deng et al. |
| 2022/0070664 A1 | 3/2022 | Stojanovski et al. |
| 2022/0174580 A1 | 6/2022 | You et al. |

OTHER PUBLICATIONS

Combined Search and Examination Report dated Jul. 21, 2020, in connection with GB Application No. 2001943.6, 5 pages.

3GPP TS 24.301 V16.3.0 (Dec. 2019), Technical Specification, 3rd Generation Partnership Project; Technical Specification Group Core Network and Terminals; Non-Access-Stratum (NAS) protocol for Evolved Packet System (EPS); Stage 3 (Release 16), Dec. 2019, 588 pages.

3GPP TS 24.501 V16.3.0 (Dec. 2019), Technical Specification, 3rd Generation Partnership Project; Technical Specification Group Core Network and Terminals; Non-Access-Stratum (NAS) protocol for 5G System (5GS); Stage 3; (Release 17), Dec. 2019, 645 pages.

3GPP TS 33.501 V17.4.2 (Jan. 2022), Technical Specification, 3rd Generation Partnership Project; Technical Specification Group Services and System Aspects; Security architecture and procedures for 5G system (Release 17), Jan. 2022, 287 pages.

Ericsson, "CIoT user data container in CPSR message not forwarded," C1-198435, 3GPP TSG-CT WG1 Meeting #121, Reno (NV), USA, Nov. 11-15, 2019, 4 pages.

Huawei, et al., "Maintain Selected EPS NAS security algorithms during N1 mode to N1 mode handover," C1ah-200019, 3GPP TSG-CT WG1 Meeting #0-121bis-e, Online, Jan. 16-22, 2020, 2 pages.

ZTE, "Clarification on the Uplink data status," C1ah-200042, 3GPP TSG-CT WG1 Meeting #121bis-e, Jan. 16-22, 2020, 5 pages.

ZTE, et al., "Small data over NAS," C1-194189, 3GPP TSG-CT WG1 Meeting #119, Wroclaw (Poland), Aug. 26-30, 2019, 42 pages.

Supplementary European Search Report dated Sep. 26, 2022, in connection with European Application No. 21754134.1, 9 pages.

Samsung, "Retransmission of a CPSR message after integrity check failure at the AMF," C1-202404, 3GPP TSG-CT WG1 Meeting #123-e, Electronic meeting, Apr. 16-24, 2020, 6 pages.

Samsung, "Uplink data status IE in CPSR after integrity check failure," C1-206006, 3GPP TSG-CT WG1 Meeting #126e, Electronic meeting, Oct. 15-23, 2020, 8 pages.

* cited by examiner

METHOD AND APPARATUS FOR NETWORK SECURITY

CROSS-REFERENCE TO RELATED APPLICATIONS

This application is a continuation of application Ser. No. 17/904,007, which is the National Phase Entry of PCT International Application No. PCT/KR2021/001682, which was filed on Feb. 9, 2021, and claims priority to British Patent Application No. 2001943.6, which was filed on Feb. 12, 2020, the contents of which are incorporated herein by reference.

BACKGROUND

1. Field

Certain examples of the present disclosure provide methods, apparatus and systems for improving security in a network. For example, certain examples of the present disclosure provide enhancements to security aspects in 3GPP 5GS.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

3GPP Standard documents disclose various operations and procedures, including the following:
  AMF and UE behavior after integrity check fails on an initial non-access stratum (NAS) message;
  Providing the UE with the EPS NAS security context in 5GS; and
  Overview of control plane and user plane CIoT 5GS optimizations.

The above information is presented as background information only to assist with an understanding of the present disclosure. No determination has been made, and no assertion is made, as to whether any of the above might be applicable as prior art with regard to the present disclosure.

SUMMARY

It is required to protecting user data over the control plane after an integrity check failure at the AMF.

It is required to reducing unnecessary run of a security mode control procedure when the UE transfers an unauthenticated PDU session for emergency service from N1 mode to S1 mode.

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims.

Other aspects, advantages, and salient features will become apparent to those skilled in the art from the following detailed description, taken in conjunction with the annexed drawings, which disclose examples of the present disclosure.

In one aspect of an embodiment, a method performed by an user equipment (UE) in a network comprising the UE and an access and mobility management function (AMF) entity is disclosed. The method may comprise: identifying that the UE in idle mode, has an emergency protocol data unit (PDU) session; transmitting, to the AMF, a control plane service request (CPSR) message comprising data of a first type; receiving, from the AMF, a security mode command message indicating that an integrity check related to the CPSR message has failed; in response to receiving the security mode command message, identifying whether the CPSR message comprises the data of the first type including data of a second type, or the CPSR message comprises the data of the first type excluding the data of the second type; and transmitting the CPSR message excluding the data of the first type except the data of the second type.

In one aspect of an embodiment, a method performed by an access and mobility management function (AMF) entity in a network comprising an user equipment (UE) and the AMF entity is disclosed. The method may comprise: identifying that the UE in idle mode, has an emergency protocol data unit (PDU) session; receiving, from the UE, a control plane service request (CPSR) message comprising data of a first type; performing an integrity check related to the CPSR message; transmitting, to the UE, a security mode command message indicating that the integrity check related to the CPSR message has failed; receiving, from the UE, a retransmission of the CPSR message; and in response to the received CPSR message comprising the data of the first type including data of a second type, acquiring, from the retransmission, the CPSR message excluding the data of the first type except the data of the second type.

In one aspect of an embodiment, an user equipment UE in a network comprising the UE and an access and mobility management function (AMF) entity is disclosed. The UE may comprise: a transmitter configured for transmitting one or more messages to one or more network entities; a receiver configured for receiving one or more messages from one or more network entities; and a processor configured for performing one or more operations: identifying that the UE in idle mode, has an emergency protocol data unit (PDU) session, transmitting, to the AMF, a control plane service request (CPSR) message comprising data of a first type, receiving, from the AMF, a security mode command message indicating that an integrity check related to the CPSR message has failed, in response to receiving the security mode command message, identifying whether the CPSR message comprises the data of the first type including data of a second type, or the CPSR message comprises the data of the first type excluding the data of the second type, and transmitting the CPSR message excluding the data of the first type except the data of the second type.

In one aspect of an embodiment, an access and mobility management function (AMF) entity in a network comprising an user equipment (UE) and the AMF entity is disclosed. The AMF may comprise: a transmitter configured for transmitting one or more messages to one or more network entities; a receiver configured for receiving one or more messages from one or more network entities; and a processor configured for performing one or more operations: identifying that the UE in idle mode, has an emergency protocol data unit (PDU) session, receiving, from the UE, a control plane service request (CPSR) message comprising data of a first type, performing an integrity check related to the CPSR message, transmitting, to the UE, a security mode command message indicating that the integrity check related to the CPSR message has failed, receiving, from the UE, a retransmission of the CPSR message, and in response to the received CPSR message comprising the data of the first type including the data of the second type, acquiring, from the retransmission, the CPSR message excluding the data of the first type except the data of the second type.

In one aspect of an embodiment, a method performed by an access and mobility management function (AMF) entity in a network comprising an user equipment (UE) and the AMF entity is disclosed. The method may comprise: identifying that the UE has an emergency protocol data unit (PDU) session; identifying that the UE supports a second mode during a registration procedure; in response to identifying that the UE supports the second mode and selecting a null encryption algorithm for a first mode of the UE, setting a null encryption algorithm as an encryption algorithm to be applied by the UE in the second mode; and transmitting, to the UE, the security mode command message comprising a first indication to apply a null encryption algorithm for the first mode and a second indication to apply a null encryption algorithm for the second mode.

In one aspect of an embodiment, a method performed by an user equipment (UE) in a network comprising the UE and an access and mobility management function (AMF) entity is disclosed. The method may comprise: identifying that the UE has an emergency protocol data unit (PDU) session; during a registration procedure, identifying that the UE supports a second mode; receiving, from the AMF, a security mode command message comprising a first indication to apply a null encryption algorithm for a first mode; and in response that the UE supports the second mode and the security mode command message does not include a second indication for an encryption algorithm to be applied in the second mode, setting a null encryption algorithm to be applied in the second mode.

In one aspect of an embodiment, an access and mobility management function (AMF) entity in a network comprising an user equipment (UE) and the AMF entity is disclosed. The AMF may comprise: a transmitter configured for transmitting one or more messages to one or more network entities; a receiver configured for receiving one or more messages from one or more network entities; and a processor configured for performing one or more operations: identifying that the UE has an emergency protocol data unit (PDU) session, identifying that the UE supports a second mode during a registration procedure, in response to identifying that the UE supports the second mode and selecting a null encryption algorithm for a first mode of the UE, setting a null encryption algorithm as an encryption algorithm to be applied by the UE in the second mode, and transmitting, to the UE, the security mode command message comprising a first indication to apply a null encryption algorithm for the first mode and a second indication to apply a null encryption algorithm for the second mode.

In one aspect of an embodiment, an user equipment UE in a network comprising the UE and an access and mobility management function (AMF) entity is disclosed. The UE may comprise: a transmitter configured for transmitting one or more messages to one or more network entities; a receiver configured for receiving one or more messages from one or more network entities; and a processor configured for performing one or more operations: identifying that the UE has an emergency protocol data unit (PDU) session, during a registration procedure, identifying that the UE supports a second mode, receiving, from the AMF, a security mode command message comprising a first indication to apply a null encryption algorithm for a first mode, and in response that the UE supports the second mode and the security mode command message does not include a second indication for an encryption algorithm to be applied in the second mode, setting a null encryption algorithm to be applied in the second mode.

BRIEF DESCRIPTION OF THE DRAWINGS

In order to illustrate the technical solutions of the embodiments of the present disclosure more clearly, the drawings accompanying the description of the embodiments will be briefly described as follows. Obviously, the drawings illustrate only some of the embodiments of the present disclosure. For those skilled in the art, other drawings may be obtained from these drawings without any creative work.

DETAILED DESCRIPTION

Figure 1:
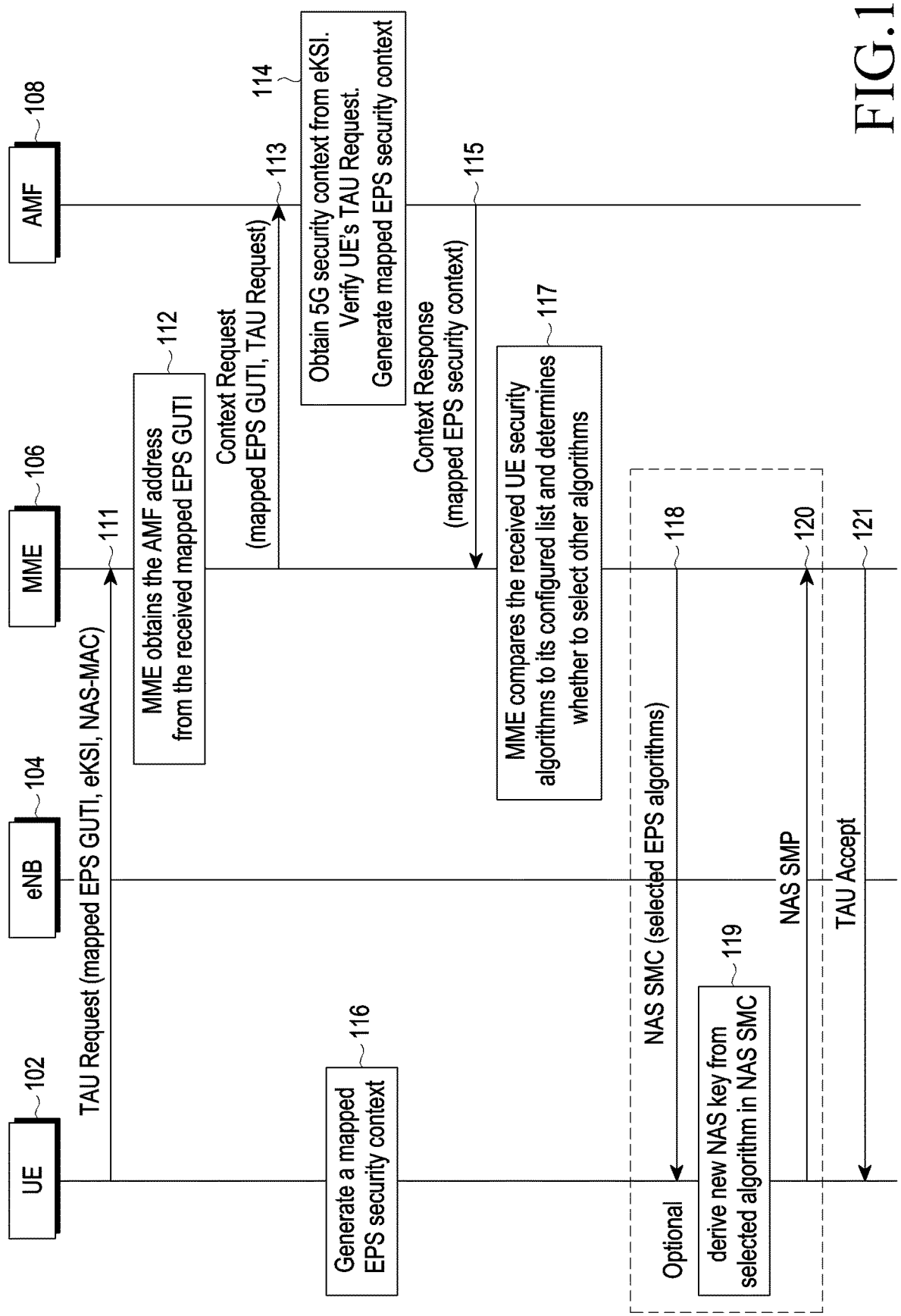
FIG. 1 illustrates generation of a mapped EPS NAS security context after idle mode mobility from N1 mode to S1 mode.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but limited to", and is not intended to (and does not) exclude other features, elements, components, integers, steps, processes, operation, function, characteristics, properties and/or groups thereof.

Throughout the description and claims of this specification, the singular form, for example "a", "an", and "the" encompasses the plural unless the context otherwise requires. For example, reference to "an object" includes reference to one or more of such objects.

Throughout the description and claims of this specification, language in the general form of "X" for "Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

Certain examples of the present disclosure provide methods, apparatus and systems for improving security in a network. For example, certain examples of the present disclosure provide enhancements to security aspects in 5GS. However, the skilled person will appreciate that the present invention is not limited to these examples, and may be applied in any suitable system or standard, for example one or more existing and/or future generation wireless communication systems or standards.

The following examples are applicable to, and use terminology associated with, 3GPP 5G. However, the skilled person will appreciate that the techniques disclosed herein are not limited to 3GPP 5G. For example, the functionality of the various network entities and messages disclosed herein may be applied to corresponding or equivalent entities and messages in other communication systems or standards. Corresponding or equivalent entities and messages may be regarded as entities and messages that perform the same or similar role within the network. The skilled person will also appreciate that the transmission of information between network entities is not limited to the specific form or type of messages described in relation to the examples disclosed herein.

A particular network entity may be implemented as a network element on a dedicated hardware, as a software instance running on a dedicated hardware, and/or as a virtualised function instantiated on an appropriate platform, e.g. on a cloud infrastructure.

Herein, the following documents are referenced:
[1] 3GPP TS 24.501 V16.3.0
[2] 3GPP TS 33.501
[3] 3GPP TS 24.301 V16.3.0

Various acronyms and abbreviations used herein are defined at the end of this description.

The above documents disclose various operations and procedures, including the following.

AMF and UE Behaviour after Integrity Check Fails on an Initial Non-Access Stratum (NAS) Message An user equipment (UE) may initiate a service request procedure (and send either a SERVICE REQUEST or CONTROL PLANE SERVICE REQUEST message) from 5GMM (5G mobility management)-IDLE mode. The integrity check at an access and mobility management function (AMF) may fail and the UE and AMF behaviour is specified as follows from [1]:

If a SERVICE REQUEST or CONTROL PLANE SERVICE REQUEST message fails the integrity check and the UE has only non-emergency protocol data unit (PDU) sessions established, the AMF shall send the SERVICE REJECT message with 5GMM cause #9 "UE identity cannot be derived by the network" and keep the 5GMM-context and 5G NAS security context unchanged. For the case when the UE has an emergency PDU session and integrity check fails, the AMF may skip the authentication procedure even if no 5G NAS security context is available and proceed directly to the execution of the security mode control procedure as specified in subclause 5.4.2. Additionally, the AMF shall include the Additional 5G security information element (IE) with the RINMR bit set to "Retransmission of the initial NAS message requested" in the SECURITY MODE COMMAND message as specified in subclause 5.4.2.2. After successful completion of the service request procedure, the network shall perform a local release of all non-emergency PDU sessions. The emergency PDU sessions shall not be released.

If the UE has an emergency PDU session when the integrity check fails during a service request procedure, the AMF proceeds directly to execute the security mode control procedure. In this case, the AMF will actually select the null encryption algorithms (EA) and null integrity algorithms (IA). This is further specified in section 5.4.2 in [1]:

The AMF shall create a locally generated KAMF and send the SECURITY MODE COMMAND message including a key set identifier for next generation ratio access network (ngKSI) value in the NAS key set identifier IE set to "000" and 5G-IA0 and 5G-EA0 as the selected NAS security algorithms only when the security mode control procedure is initiated:

a) during an initial registration procedure for emergency services if no shared 5G NAS security context is available;

b) during a registration procedure for mobility and periodic registration update for a UE that has an emergency PDU session if no shared 5G NAS security context is available;

c) during a service request procedure for a UE that has an emergency PDU session if no shared 5G NAS security context is available; or d) after a failed primary authentication and key agreement procedure for a UE that has an emergency PDU session or is establishing an emergency PDU session, if continued usage of a shared 5G NAS security context is not possible.

As quoted above, the AMF will include the Additional 5G security information IE with the RINMR bit set to "Retransmission of the initial NAS message requested" in the SECURITY MODE COMMAND message. The UE behaviour in this case is quoted below from [1]:

If, during an ongoing service request procedure for a UE with an emergency PDU session, the AMF is initiating a SECURITY MODE COMMAND (i.e. after receiving the SERVICE REQUEST message, but before sending a response to that message) and the SERVICE REQUEST message does not successfully pass the integrity check at the AMF, the AMF shall include the Additional 5G security information IE with the RINMR bit set to "Retransmission of the initial NAS message requested" in the SECURITY MODE COMMAND message requesting the UE to send the entire SERVICE REQUEST message in the SECURITY MODE COMPLETE message as described in 3GPP TS 33.501 [24].

Usually, when the RINMR bit is set as described above, the UE will have to send the entire initial NAS message again (in this case the SERVICE REQUEST message) in the Security Mode Complete.

It should be noted that the Security Mode Complete, although sent using the 5G-IA0 and 5G-EA0 security algorithms, will effectively be sent in the clear since these algorithms are the null algorithms that are used when the UE has an emergency PDU session and has not been authenticated (after integrity check failure).

Providing the UE with the EPS NAS Security Context in 5GS

When a UE that supports S1 mode (i.e. a mode of a UE that operates with a functional division that is in accordance with the use of an S1 interface between the radio access network and the core network) registers with the 5G core network, the network which supports the N26 interface (interface between MME and AMF) provides the UE with the selected EPS NAS security algorithms which the UE will use after an inter-system change to S1 mode. The EPS NAS security algorithms are provided during the security mode control procedure that is performed in 5GS. Providing the selected EPS NAS security algorithms in 5GS helps avoid having the MME (i.e. the core network of the EPS) to run the security mode control procedure when the UE goes to EPS. With this method of pre-informing the UE of the selected EPS NAS security algorithms, the UE will use these algorithms upon inter-system change from N1 mode (i.e. a mode of a UE allowing access to the 5G core network via the 5G access network) to S1 mode without the need to perform the corresponding NAS procedure again in EPS.

FIG. 1 (from 3GPP TS 33.501 [2]) shows how the UE, after an inter-system change from N1 mode to S1 mode, uses the selected EPS NAS security algorithms to generate the mapped EPS NAS security context.

In step 111, the UE 102 initiates the TAU procedure by sending, via the eNB 104 a TAU Request to the MME 106 with a mapped EPS GUTI derived from the 5G GUTI and its EPS security capabilities. The mapped EPS GUTI contains the information of the AMF 108 that has the latest UE context in the 5G network.

The UE integrity protects the TAU Request message using the current 5G NAS security context identified by the 5G GUTI used to derive the mapped EPS GUTI. More precisely, the UE shall compute the NAS MAC for the TAU request as it is done for a 5G NAS message over a 3GPP access. The NAS Uplink COUNT for integrity protection of the TAU request shall use the same value as the 5G NAS Uplink COUNT. Consequently, this results in an increase of the stored NAS Uplink COUNT value in the NAS COUNT pair associated with the 3GPP access. The corresponding ngKSI value of the 5G Security context is included in the eKSI parameter of the TAU Request message.

In step 112, upon receipt of the TAU Request, the MME obtains the AMF address from the mapped EPS GUTI value.

In step 113, the MME forwards the complete TAU Request message including the eKSI, NAS-MAC and mapped EPS GUTI in the Context Request message.

In step 114, The AMF shall use the eKSI value field to identify the 5G NAS security context and use it to verify the TAU Request message as if it was a 5G NAS message received over 3GPP access.

In step 115, if the verification is successful, the AMF shall derive a mapped EPS NAS security context as described in clause 8.6.1. The AMF shall set the EPS NAS algorithms to the ones indicated earlier to the UE in a NAS SMC as described in clause 6.7.2.

The AMF shall include the mapped EPS NAS security context in the Context Response message it sends to the MME. The AMF shall never transfer 5G security parameters to an entity outside the 5G system.

In step 116, the UE shall derive a mapped EPS NAS security context as described in clause 8.6.1. The UE shall select the EPS algorithms using the ones received in an earlier NAS SMC from the AMF as described in clause 6.7.2. The UE shall immediately activate the mapped EPS security context and be ready to use it for the processing of the TAU Accept message in step 7. In one embodiment, the UE may generate the mapped EPS NAS security context and uses the selected EPS NAS security algorithms that were received in N1 mode as indicated below based on [2].

In step 117, the MME compares the UE security algorithms to its configured list after it receives the Context Response message. If an algorithm change is required, the MME shall select the NAS algorithm which has the highest priority from its configured list and is also present in the UE 5G security capabilities and initiate an NAS SMC to the UE. Otherwise, step 8-10 shall be skipped.

In steps 118, 119, and 120, the MME and the UE performs an NAS SMC to derive new NAS keys with the new algorithms as described in Clause 7.2.8.1.2 of TS 33.401 [10].

In step 121, the MME completes the procedure with a TAU Accept message.

After successful completion of the TAU procedure, the UE shall delete any mapped 5G security context.

It should also be noted that in EPS, when the UE sends a TAU message and the UE has a PDN connection for emergency service, the MME initiates a security mode control procedure and selects the null algorithms for encryption and integrity protection as specified in section 5.4.3.2 of 3GPP TS 24.301 [3]:

The MME shall create a locally generated KASME and send the SECURITY MODE COMMAND message including a KSI value in the NAS key set identifier IE set to "000" and EIA0 and EEA0 as the selected NAS security algorithms only when the security mode control procedure is initiated:

during an attach procedure for emergency bearer services if no shared EPS security context is available;
  during an attach procedure for access to RLOS if no valid EPS security context is available;
  during a tracking area updating procedure for a UE that has a PDN connection for emergency bearer services if no shared EPS security context is available;
  during a tracking area updating procedure for a UE that has a PDN connection for access to RLOS if no valid EPS security context is available;

during a service request procedure for a UE that has a PDN connection for emergency bearer services if no shared EPS security context is available;

during a service request procedure for a UE that has a PDN connection for access to RLOS if no valid EPS security context is available;

after a failed authentication procedure for a UE that has a PDN connection for emergency bearer services or that is establishing a PDN connection for emergency bearer services, if continued usage of a shared security context is not possible; or after a failed authentication procedure for a UE that has a PDN connection for access to RLOS or that is establishing a PDN connection for access to RLOS, if continued usage of a valid security context is not possible.

Hence, it is expected that the MME uses the null algorithms when the UE performs a TAU procedure and has a PDN connection for emergency service. That can be the case when the UE moves from N1 mode to S1 mode and the UE has a PDU session for emergency service that should be transferred to EPS.

Overview of Control Plane and User Plane CIoT 5GS Optimizations 5G cellular internet of things (CIoT) was introduced in Rel-16 and enables the transmission of data over the control plane amongst many other features. The use of control plane CIoT 5GS optimization is applicable to UEs in WB-N1 mode and NB-N1 mode.

When using control plane CIoT 5GS optimization, the UE in 5GMM-IDLE mode sends data over NAS by sending the CPSR message that includes the data as specified in [1]. Once in 5GMM-CONNECTED mode, the UE uses the UL NAS TRANSPORT message to send more UL data.

The skilled person will appreciate that the present invention is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements or entities may be added to the examples disclosed herein.

One or more non-essential elements or entities may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system comprising one or more such apparatuses/devices/network entities, and/or a method therefor.

In the following examples, a network may include a UE and an AMF entity.

In the techniques of the related art, for example those referred to above, there occur the following problems.

1. Protecting User Data Over the Control Plane after an Integrity Check Failure at the AMF If during a service request procedure the UE receives a Security Mode Command message with the RINMR bit set to "Retransmission of the initial NAS message requested" in the SECURITY MODE COMMAND message, the UE should send the entire NAS message again in the Security Mode Complete message as per the initial NAS message protection mechanism that was defined in Rel-15. One problem is that the current specification [1] does not specify the behaviour at the UE if the initial NAS message was a Control Plane Service Request message which may contain data.

If the initial NAS message, for which the integrity protection failed and which triggered the sending of the Security Mode Command message as described above, was a Control Plane Service Request, then following purely the existing mechanism for initial NAS message protection, the UE would have to resend the entire Control Plane Service Request in the NAS message container IE that is included in the Security Mode Complete message. Note that this is in fact not specified.

However, if the UE has a PDU session for emergency services and the network has indicated the use of null algorithms, then including the same entire Control Plane Service Request message in the Security Mode Complete message will lead to the data (in the Control Plane Service Request message) being exposed i.e. the data will be sent without any protection, since the selected algorithms are based on the null algorithms. The problem is described in FIG. 2.

Figure 2:
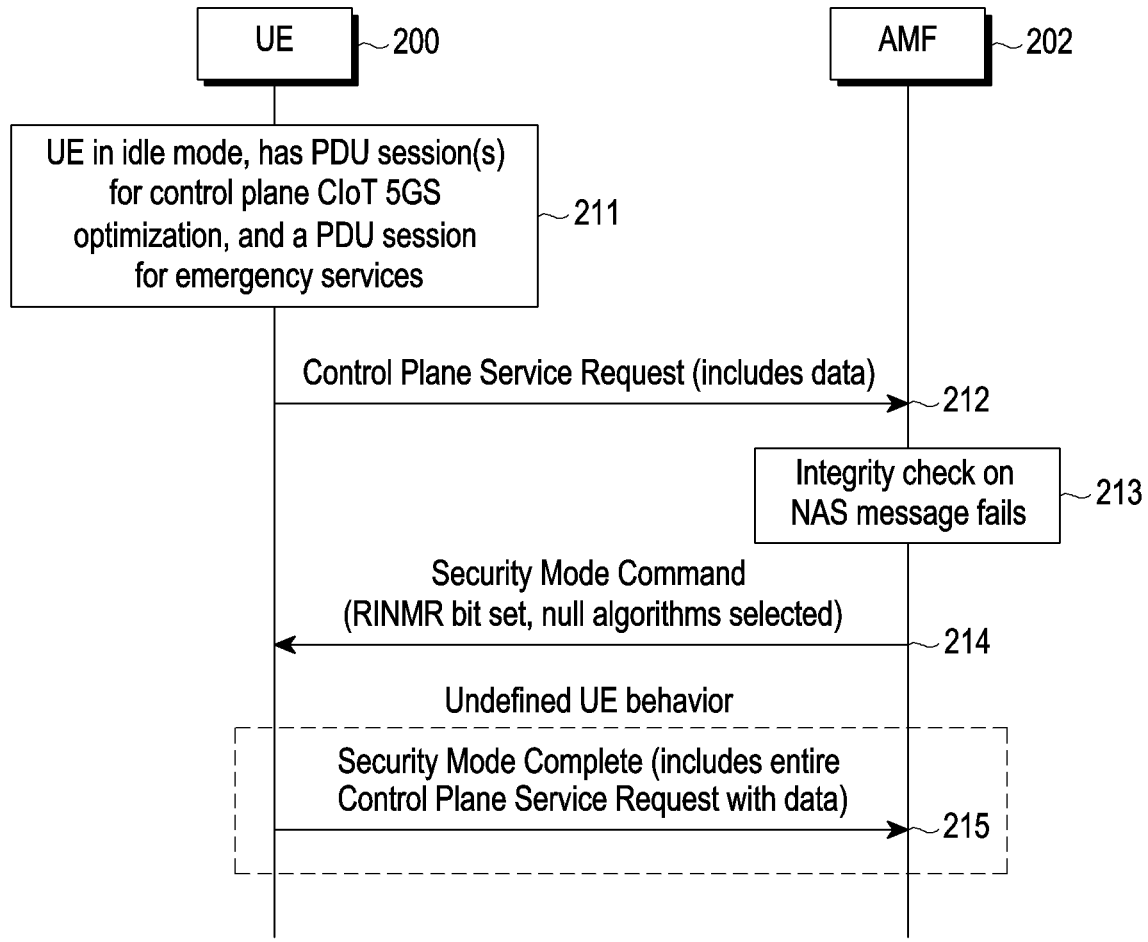
FIG. 2 illustrates a problem following integrity check failure of a Control Plane Service Request message containing data.

Referring to FIG. 2, in step 211, the UE 200 in idle mode, has PDU session(s) for control plane CIoT 5GS optimization, and a PDU session for emergency services.

In step 212, the Control Plane Service Request message (includes data) is transmitted by the UE to the AMF 202

In step 213, An integrity check on a NAS message comprising the Control Plane Service Request message fails in the AMF.

In step 214, the Security Mode Command message (RINMR bit set, null algorithms selected) is sent to the UE.

In step 215, as an undefined UE behavior, the Security Mode Complete message (includes the entire Control Plane Service Request message with data) may be sent by the UE to the AMF.

As indicated in FIG. 2, the UE behaviour in the identified scenario (specifically after Step 4) is undefined. However, if the UE were to purely follow the existing behaviour regarding initial NAS message protection, the UE would send the Security Mode Complete message with the entire Control Plane Service Request message which contains data (shown in Step 5). Moreover, as null algorithms have been selected, the data will effectively be sent without any protection. This should not be allowed for data that is not related to an unauthenticated PDU session for emergency service. In fact data over NAS shall only be sent when encryption and integrity protection, not based on null algorithms, are in place.

2. Unnecessary Run of a Security Mode Control Procedure when the UE Transfers an Unauthenticated PDU Session for Emergency Service from N1 Mode to S1 Mode The UE that supports S1 mode will receive the selected EPS NAS security algorithms when it registers in 5GS if the network supports the N26 interface. The UE may have established a PDU session for emergency services in N1 mode and may enter idle mode although the PDU session is still active at the NAS (UE and network). If the UE sends a Service Request message that fails the integrity check at the AMF, the AMF will run the security mode control procedure and select the null algorithms (5G-IA0 and 5G-EA0) for the 5G NAS security context as described earlier.

When this occurs however, the selected EPS NAS algorithms do not seem to be changed in N1 mode (i.e. in 5GS). This means that if the UE, which only has a PDU session for emergency service, moves to EPS in idle mode, then the UE will:
set the eKSI in the TAU to the value of the ngKSI which is "000" (since null algorithms were used in 5GS);
create a mapped EPS NAS security context based on the selected EPS NAS security algorithms that were received in N1 mode noting that these algorithms are not the EPS null algorithms.

The problem with the above is that the eKSI will be set to "000" which reflects the key set identifier when null algorithms are used whereas the actual EPS NAS security algorithms being used are not the null algorithms. Moreover, as indicated earlier, since the UE is performing a TAU procedure and only has a PDN connection for emergency service, the MME is supposed to run the security mode control procedure and select null algorithms for the UE.

This means that the security mode control procedure is inevitable and actually defeats the purpose of providing the selected EPS NAS security algorithms to the UE in 5GS. Therefore, the scenario for which the UE has unauthenticated PDU session for emergency service in 5GS needs to take into account the UE's support of S1 mode and selection of the corresponding EPS NAS security algorithms, while in 5GS, in order to avoid running the security mode procedure again when the UE moves to EPS.

The problem above occurs when the network in 5GS decides to use the null algorithms for the UE but does not change the selected EPS NAS security algorithms.

Certain examples of the present disclosure address the above problems and provide an enhanced security framework in 5GS, for example as summarized below:
In certain examples of the present disclosure, when the network selects the null algorithms after the integrity check fails at the network, the UE should refrain from sending data that is not related to a PDU session for emergency service. This protects the non-emergency data (CIoT user data, short messaging service (SMS), location services message) from being sent unprotected as required from a security point of view.
In certain examples of the present disclosure, when the network indicates to the UE that the null algorithms should be used for the 5G NAS security context, the network should also set the selected EPS NAS algorithms to the null algorithm. This avoids an unnecessary security mode control procedure if the UE performs an inter-system change from N1 mode to S1 mode. Otherwise, the purpose of the selected EPS NAS algorithms is defeated and leads unnecessary system signalling.

Accordingly, certain examples of the present disclosure may apply one or more of the following techniques.

1. Changing the Contents of the Control Plane Service Request Message after the Network Selects the Null Algorithms When the UE sends a Control Plane Service Request message with CIoT user data, SMS, or location services message (hereafter generally referred to as data) and the UE receives a Security Mode Command message with the Additional 5G security information IE with the RINMR bit set to "Retransmission of the initial NAS message requested", then the UE should behave as follows:
if the UE had included data in the Control Plane Service Request message before the Security Mode Command message (with the RINMR bit set to "Retransmission of the initial NAS message requested") was received, the UE should encapsulate or include the Control Plane Service Request message in the NAS message container IE, which is included in the Security Mode Complete message, however the Control Plane Service Request message should not contain any data (i.e. CIoT user data, SMS, or location services message). Furthermore, the Control Plane Service Request message should also not contain any of the following IEs or information, if the UE had previously sent any in the Control Plane Service Request message that was initially sent in idle mode:
PDU session ID IE
Additional information IE
Payload container type IE
Payload container IE
Release assistance indication IE
CIoT small data container IE
Note that the UE can include the Uplink data status IE or the PDU session status IE in the Control Plane Service Request message if any of these IEs, or both, were included in the initial Control Plane Service Request message that was sent from idle mode.
if the Control Plane Service Request that was sent, before the Security Mode Command message (with the RINMR bit set to "Retransmission of the initial NAS message requested") was received, included the PDU session status IE only, or the Uplink data status IE only, or both the PDU session status IE and Uplink data status IE, then the UE can send the same Control Plane Service Request message in the NAS message container IE that is sent in the Security Mode Complete message.

Certain examples of the present disclosure applying the above technique may avoid sending data (CIoT user data, SMS, or location services messages) when the null algorithms are being used as they effectively mean that the NAS message is sent with no protection.

Figure 3:
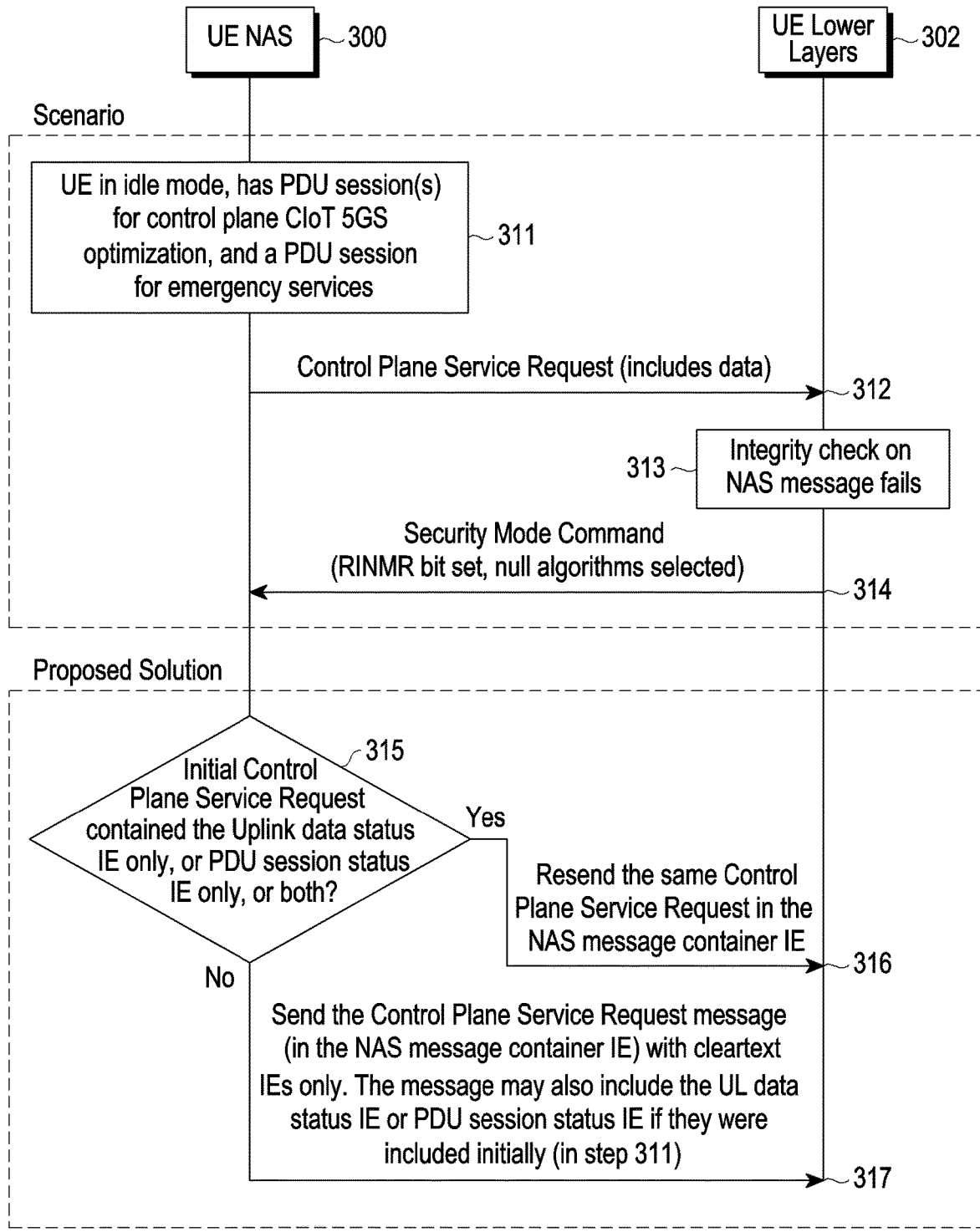
FIG. 3 illustrates an example of the present disclosure providing improved security.

The above technique is illustrated in FIG. 3.

In step 311, the UE 300 in idle mode, may have PDU session(s) for control plane CIoT 5GS optimization, and a PDU session for emergency services.

In step 312, the UE may transmit a Control Plane Service Request message (includes data) to the AMF 302

In step 313, the AMF may fail Integrity check on NAS message including the Control Plane Service Request message.

In step 314, the AMF may send a Security Mode Command message (including a RINMR bit being set, that is null algorithms being selected) to the UE.

According to one embodiment of the proposed solution, in step 315, the UE may determines whether the initially transmitted Control Plane Service Request message contains the Uplink data status IE only, or PDU session status IE only, or both, without other data of non-cleartext IEs.

If Yes in step 315, in step 316, the UE may resend the same Control Plane Service Request message in the NAS message container IE to the AMF.

If No in step 315, in step 317, the UE may send the Control Plane Service Request message (in the NAS message container IE) with cleartext IEs only to the AMF. The message may also include the UL data status IE or PDU session status IE if they were included initially (in step 311)

The cleartext IEs comprises Information elements that can be sent without confidentiality protection in initial NAS messages. In one embodiment, the initial Control Plane Service Request message may include at least one of the following cleartext IEs:

Extended protocol discriminator;
Security header type;
Spare half octet;
ngKSI;
Control plane service request message identity; and
Control plane service type In one embodiment, the initial Control Plane Service Request message may include at least one of the following non-cleartext IEs:

CIoT small data container
Payload container type
Payload container
PDU session ID
PDU session status
Release assistance indication
Uplink data status
NAS message container
Additional information 2. Setting the Selected EPS NAS Algorithms to Null when the UE has an Unauthenticated PDU Session for Emergency Service in 5GS When the AMF sends the Security Mode Command message including an ngKSI value in the NAS key set identifier IE set to "000" and 5G-IA0 and 5G-EA0 as the selected NAS security algorithms, if the UE supports S1 mode and the network supports the N26 interface, then the AMF should also include the Selected EPS NAS security algorithms IE in the Security Mode Command message.

If the UE receives a Security Mode Command message with an ngKSI value in the NAS key set identifier IE set to "000" and 5G-IA0 and 5G-EA0 as the selected NAS security algorithms, the UE supports S1 mode and N26 interface is supported in the network, and if the Selected EPS NAS security algorithms IE is not included in the Security Mode Command message, the UE should locally set the selected EPS NAS algorithms to null i.e. to EIA0 and EEA0. The UE may optionally set the selected EPS NAS algorithms to null when the UE performs an inter-system change from N1 mode to S1 mode in idle mode, optionally when generating the mapped EPS NAS security context.

The skilled person will appreciate that the above technique is not limited to the integrity check failure during a service request. The technique may be applied to all cases in which the network selects the null algorithms as the algorithms for the 5G NAS security context.

By applying one or more of the various techniques described above, when the network chooses the null algorithms in 5GS, data that is not related to a PDU session for emergency service will not be sent in an unprotected manner. Also, unnecessary signaling may be avoided as the UE performs inter-system change between 5GS (N1 mode) and EPS (S1 mode).

Figure 4:
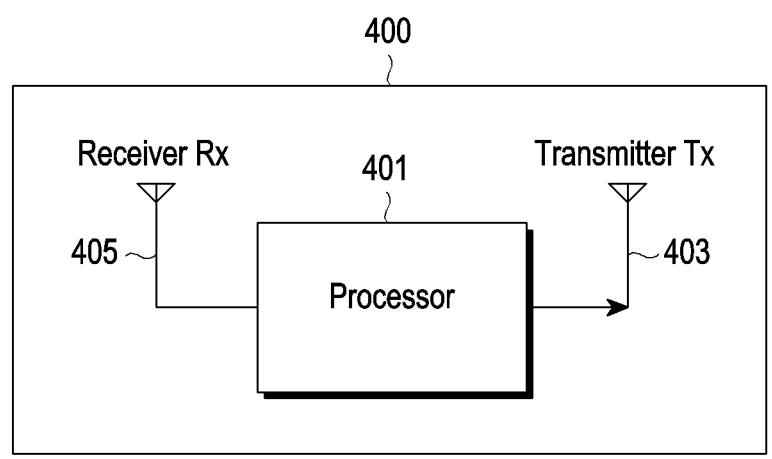
FIG. 4 is a block diagram of an exemplary network entity that may be used in certain examples of the present disclosure.

FIG. 4 is a block diagram of an exemplary network entity or UE that may be used in examples of the present disclosure. The skilled person will appreciate that a network entity may be implemented, for example, as a network element on a dedicated hardware, as a software instance running on a dedicated hardware, and/or as a virtualised function instantiated on an appropriate platform, e.g. on a cloud infrastructure.

Referring to FIG. 4, the entity or UE 400 comprises a processor (or controller) 401, a transmitter 403 and a receiver 405. The receiver 405 is configured for receiving one or more messages from one or more other network entities, for example as described above. The transmitter 403 is configured for transmitting one or more messages to one or more other network entities, for example as described above. The processor 401 is configured for performing one or more operations, for example according to the operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims.

Abbreviations

In the present disclosure, the following acronyms are used.
3 GPP: 3rd Generation Partnership Project
5G: 5th Generation
5GMM: 5G Mobility Management
5GS: 5G System
AMF: Access and Mobility Management Function
CIoT: Cellular IoT
CPSR: Control Plane Service Request
eKSI: KSI for E-UTRAN
eNB: evolved node B, or Base Station
EPS: Evolved Packet System
E-UTRAN: Evolved Universal Terrestrial Radio Access Network
GUTI: Globally Unique Temporary UE Identity
ID: Identity
IE: Information Element
IoT: Internet of Things
K: Key
KSI: Key Set Identifier
MAC: Medium Access Control
MME: Mobility Management Entity
N1: Interface between UE and AMF
NAS: Non Access Stratum
NB: Narrowband
ngKSI: KSI in 5G
PDN: Packet Data Network
PDU: Protocol Data Unit
Rel: Release
RINMR: Retransmission of Initial NAS Message Requested
RLOS: Restricted Local Operator Services
SMC: Security Mode Command
SMS: Short Message Service
TAU: Tracking Area Request
TS: Technical Specification
UE: User Equipment
UL: UpLink/Uplink
WB: Wideband Particular aspects of the present disclosure may be implemented as a computer-readable code in a computer-readable recording medium. The computer-readable recording medium may be a data storage device, which can store data which can be read by a computer system. Examples of the computer readable recording medium may include a Read-Only Memory (ROM), a Random Access Memory (RAM), a CD-ROM, a magnetic tape, a floppy disk, an optical data storage device, and a carrier wave (such as data transmission through the Internet). The computer-readable recording medium may be distributed through computer systems connected to the network, and accordingly, the computer-readable code may be stored and executed in a distributed manner. Further, functional programs, codes and code segments for achieving the present disclosure may be easily interpreted by programmers skilled in the art which the present disclosure pertains to.

The above-described methods and apparatuses according to embodiments of the present disclosure may be implemented in the form of hardware, software, or a combination of hardware and software. Any such software may be stored, e.g., in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. A method according to an embodiment of the present disclosure may be implemented by a computer or portable terminal including a controller and a memory, wherein the memory is one example of machine-readable storage media suitable to store a program or programs including instructions for implementing the embodiments of the present disclosure.

Accordingly, the present disclosure includes a program for a code that implements the apparatus and method described in the appended claims of the specification and a machine (a computer or the like)-readable storage medium for storing the program. Further, the program may be electronically carried by any medium such as a communication signal transferred through a wired or wireless connection, and the present disclosure appropriately includes equivalents thereof.

Further, an apparatus according to various embodiments of the present disclosure may receive the program from a program providing device that is wiredly or wirelessly connected thereto, and may store the program. The program providing device may include a program including instructions through which a program processing device performs a preset content protecting method, a memory for storing information required for the content protecting method, a communication unit for performing wired or wireless communication with the program processing device, and a controller for transmitting the corresponding program to a transceiver at the request of the program processing device or automatically.

While the present disclosure has been particularly shown and described with reference to certain embodiments thereof, it will be understood by those of ordinary skill in the art that various changes in form and details may be made therein without departing from the scope of the present disclosure as defined by the following claims and their equivalents.

What is claimed is:

1. A method performed by an access and mobility management function (AMF), the method comprising:
    receiving, from a user equipment (UE), a first message comprising data of a first type;
    transmitting, to the UE, a second message indicating that an integrity check related to the first message has failed; and
    receiving, from the UE, a retransmission of the first message excluding the data of the first type.

2. The method according to claim 1, wherein the UE in idle mode, has an emergency protocol data unit (PDU) session.

3. The method according to claim 1, further comprising:
    acquiring, from the received first message, the data of the first type excluding data of a second type, and
    acquiring, from the retransmission, the data of the second type.

4. The method according to claim 1, wherein the retransmission of the first message comprises the first message encapsulated in a non-access stratum (NAS) message container information element (IE) included in a security mode complete message, and
    wherein the retransmission of the first message includes data of a second type without other data of the first type.

5. The method according to claim 4, wherein the data of the second type comprises at least one data status information element (IE), the at least one data status IE comprises uplink data status IE.

6. The method according to claim 1, wherein the data of the first type comprises one or more of: non-cleartext information elements (IEs), the non-cleartext IEs comprising cellular internet of things (CIoT) user data; a short messaging service (SMS); and a location service message.

7. The method according to claim 1, wherein the data of the first type comprises one or more of: a PDU session identity (ID) information element (IE); an additional information IE; a payload container type IE; a payload container IE; a release assistance indication IE; and a cellular internet of things (CIoT) small data container IE.

8. An access and mobility management function (AMF), the AMF comprising:
a transceiver; and
a processor configured to control the transceiver to:
receive, from a user equipment (UE), a first message comprising data of a first type,
transmit, to the UE, a second message indicating that an integrity check related to the first message has failed, and
receive, from the UE, a retransmission of the first message excluding the data of the first type.

9. The AMF according to claim 8, wherein the processor is configured to identify that the UE in idle mode, has an emergency protocol data unit (PDU) session.

10. The AMF according to claim 8, wherein the processor is configured to:
acquire, from the received first message, the data of the first type excluding data of a second type; and
acquire, from the retransmission, the data of the second type.

11. The AMF according to claim 8, wherein the retransmission of the first message comprises the first message encapsulated in a non-access stratum (NAS) message container information element (IE) included in a security mode complete message, and
wherein the retransmission of the first message includes data of a second type without other data of the first type.

12. The AMF according to claim 11, wherein the data of the second type comprises at least one data status information element (IE), the at least one data status IE comprises uplink data status IE.

13. The AMF according to claim 8, wherein the data of the first type comprises one or more of: non-cleartext information elements (IEs), the non-cleartext IEs comprising cellular internet of things (CIoT) user data; a short messaging service (SMS); and a location service message.

14. The AMF according to claim 8, wherein the data of the first type comprises one or more of: a PDU session identity (ID) information element (IE); an additional information IE; a payload container type IE; a payload container IE; a release assistance indication IE; or a cellular internet of things (CIoT) small data container IE.

15. A method, by a user equipment (UE), the method comprising:
transmitting, to an access and mobility management function (AMF), a first message comprising data of a first type;
receiving, from the AMF, a second message indicating that an integrity check related to the first message has failed; and
in response to receiving the second message, retransmitting the first message excluding the data of the first type.

16. The method according to claim 15, wherein the first message is a control plane service request (CPSR) message,
wherein the second message comprises a security mode command, and
wherein retransmitting the first message comprises transmitting a security mode complete message comprising the first message.

17. The method according to claim 16, wherein the security mode command includes one or more of: an indicator for requesting retransmission of the first message; and an indication to apply a null encryption algorithm.

18. The method according to claim 15, wherein the data of the first type comprises one or more of: cellular internet of things (CIoT) user data; short messaging service (SMS); or location service message.

19. The method according to claim 15, wherein the first message comprises data of a second type, and wherein the retransmitted first message comprises the data of the second type.

20. A user equipment (UE) comprising:
a transceiver configured to transmit one or more messages to one or more network entities and receive one or more messages from one or more network entities; and
a processor configured to:
transmit, to an access and mobility management function (AMF), a first message comprising data of a first type,
receive, from the AMF, a second message indicating that an integrity check related to the first message has failed, and
in response to receiving the second message, retransmitting the first message excluding the data of the first type.

* * * * *